United States Patent [19]

Smith

[11] 3,959,941
[45] June 1, 1976

[54] WEATHER STRIP WITH INSERTABLE COVER STRIP

[75] Inventor: Leonard W. Smith, Freemont, Ohio

[73] Assignee: The Standard Products Company, Cleveland, Ohio

[22] Filed: Feb. 5, 1975

[21] Appl. No.: 547,108

Related U.S. Application Data

[63] Continuation of Ser. No. 451,473, March 15, 1974, abandoned.

[52] U.S. Cl. ............................. 52/400; 52/208; 52/396
[51] Int. Cl.² .................. B60J 1/00; E04F 15/14
[58] Field of Search ............ 52/204, 398, 400, 403, 52/404, 627, 208, 105, 753 C, 397, 396

[56] References Cited
UNITED STATES PATENTS

| | | | |
|---|---|---|---|
| 2,683,905 | 7/1954 | Beck | 52/400 |
| 2,698,072 | 11/1954 | Beck | 52/400 |
| 2,759,575 | 9/1956 | Marvin | 52/400 |
| 2,763,346 | 9/1956 | Clingman | 52/400 |
| 3,783,568 | 1/1974 | Adler et al. | 52/400 |
| 3,897,666 | 8/1975 | McClure | 52/400 |

FOREIGN PATENTS OR APPLICATIONS

| | | | |
|---|---|---|---|
| 1,230,894 | 6/1971 | United Kingdom | 52/208 |

*Primary Examiner*—Ernest R. Purser
*Assistant Examiner*—Robert Farber
*Attorney, Agent, or Firm*—Harness, Dickey & Pierce

[57] ABSTRACT

A weather strip for supporting a panel such as a window pane within an opening formed in a support structure is adapted to interlockingly support a separate cover strip. In one form of the invention, the cover strip forms a decorative moulding at least partially around the perimeter of the opening, and in a second form is adapted to support a marginal edge of a panel of insulation or the like adapted for lining the wall of the support structure.

3 Claims, 4 Drawing Figures

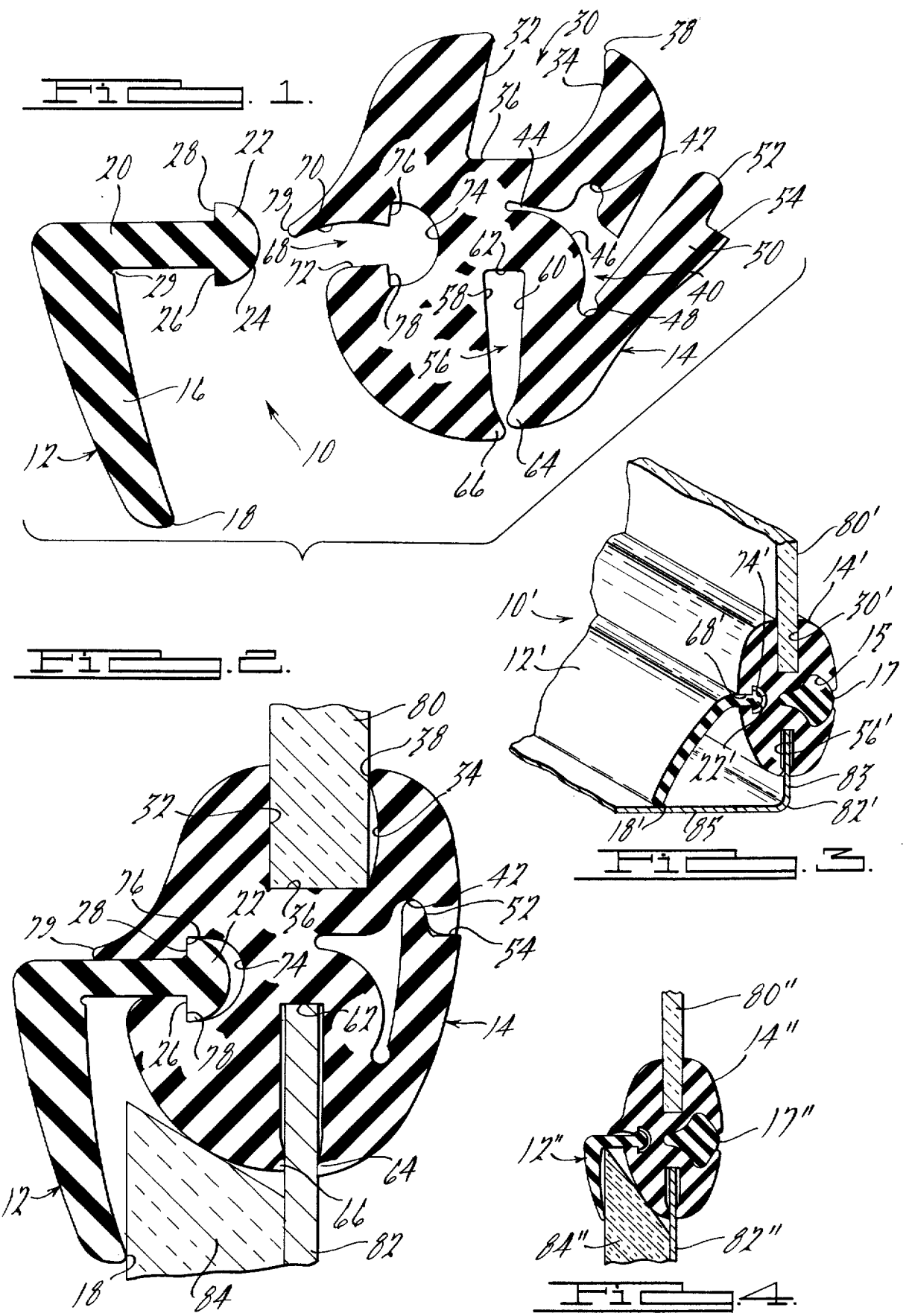

WEATHER STRIP WITH INSERTABLE COVER STRIP

This is a continuation of application Ser. No. 451,473, filed Mar. 15, 1974, now abandoned.

BACKGROUND AND SUMMARY OF THE INVENTION

The present invention relates generally to the art of weather strips for windows and windshields, and more particularly to an improved weather strip assembly including a separate insertable cover strip. The cover strip can be provided in various dimensional configurations whereby various thicknesses of insulation panel can be used with the same weather strip.

Generally speaking, self-sealing weather strips are a type of rubber gasket commonly used to seal a glass or plastic window within an opening provided in a supporting structure such as a building wall or vehicle body. These weather strips are commonly formed by an extrusion process and can be composed generally of an elastomeric material such as ethylene-propylene-diene monomer (EPDM) or neoprene. When it is desirable to line the interior wall and/or roof of the structure with an insulation panel, it is customary in the trade to provide a weather strip having an integrally formed protrusion adapted to retainingly cover the exposed marginal edge of the panel along the perimeter of the window opening. This protrusion or integral cover strip performs both a functional and decorative purpose in that it protects the above-mentioned edge and also defines a trimming strip which enhances the appearance of the window or opening. Specific application of the weather strip sealing system used in conjunction with an insulation panel are found in such exemplary agricultural and construction equipment as tractors and cranes wherein an enclosed cab may be provided for the comfort and protection of the operator and also in such stationary structures as toll booths, parking lot offices, temporary office facilities, and the like.

It has been found, however, that a primary disadvantage of the above indicated type of weather strip resides in the fact that the thickness of the insulation panel cannot be increased or decreased without providing an entirely new weather strip having a properly sized, integral cover strip. This is due to the practice of extruding the cover strip as an integral part of the gasket member, i.e. both members forming a unitary or monolithic structure. Note that from a manufacturing standpoint, the above requirements are in addition to the necessity of providing weather strips to accommodate various glass thicknesses and various supporting structure panel thicknesses. Moreover, it will be noted that there is no structural reason limiting the material of the cover strip to the same chemical compound as the gasket member, and as a matter of economy and practicality, less expensive compounds could be utilized with respect to cover strip whereby to achieve the same advantages. It, therefore, is a general object of the present invention to provide a new and improved weather strip in combination with a separately installed cover strip.

Accordingly, the system of the present invention provides a separate cover strip which is retainingly insertable into the weather strip during assembly of the window system, is held in place by a cooperative interlocking relationship or arrangement, and is adapted to be produced in different sizes whereby to accommodate varying thicknesses of insulation. Assuming a constant glass thickness and structural panel thickness, the degree of thickness of the insulation panel has no affect on the actual weather strip to be used, as only the cover strip need be sized to accommodate the panel. In accordance with the present invention, the weather strip is provided with a glass receiving channel comprising spaced, generally parallel lips which are subject to sealingly engage the edge of the glass or plastic panel. On an opposite side of the weather strip, a second receiving channel is provided which is adapted to be seated along the perimeter of the support structure. The second channel can be of the same basic configuration as the glass receiving channel but is used primarily to sealingly engage the weather strip relative to the structural panel or a flange projecting therefrom. One lateral side of the gasket is provided with a cover strip receiving passage which includes a self-interlocking means for cooperatively receiving the cover strip. A second passage is located on an opposite side of the cover strip receiving passage and is adapted to receive a filler or lock strip. The cover strip is generally L-shaped and is provided with an integral locking means along one marginal edge which can be a double flange protrusion or a saw-toothed construction. It, therefore, is another object of the present invention to provide a cover strip which facilitates using the same type of weather strip with insulation panels of varying thickness.

Greater flexibility can be achieved according to the cover strip of the present invention than has heretofore been possible. In view of the fact that the cover strip is manufactured separately from the weather strip, it may be formed of an elastomeric material having a durometer reading less than that usually required of the weather strip thereby allowing greater flexibility and consequently easier installation. By way of example, the hardness of the weather strip is generally of the magnitude of 65 as measured by a durometer gauge (shore A), whereas it may be desirable to provide a cover strip with a durometer of 55. For some applications the cover strip may be an elastomeric material such as EPDM or neoprene whereas for others, a vinyl material such as polyvinyl chloride can be used. Moreover, a variety of decorative options are thereby available to the practitioner if he so desires. It, therefore, is a further object of the present invention to provide a combination weather strip-cover strip that can be provided in differing structural hardnesses, in a variety of decorative options, and which will provide certain commercial advantages over one-piece weather strip assemblies previously utilized.

Although the novel disclosure herein provided is primarily concerned with a weather strip with a separate cover strip which is insertable therein to protect the edge of an insulation panel and to finish off the interior appearance of the window or windshield, the principle disclosed herein may be applied to an interior garnish moulding. As will be appreciated in a vehicle or building structure without an insulation panel, a garnish moulding utilizing the same interlocking means as the above mentioned cover strip may be inserted into the weather strip to achieve a desired decorative effect. It, therefore, is another object of the present invention to provide a weather strip of the above character which may be utilized to receive a trim strip forming a garnish moulding around the perimeter of a window opening.

Some applications for the present invention other than an industrial or agricultural applications previously indicated may be in mobile homes, trailers, recreational vehicles, busses, marine crafts, passenger trains, or similar applications wherein a stationary window is sealed with an elastomeric gasket. It, therefore, is still another object of the present invention to provide a weather strip of the above indicated character which will find universality of application.

Other objects, features, and advantages of the present invention will become apparent from the following detailed description taken in conjunction with the accompanying drawings.

BRIEF DESCRIPTION OF THE DRAWINGS

FIG. 1 is a cross-sectional view of a combination weather strip-cover strip assembly in accordance with a first preferred embodiment of the present invention;

FIG. 2 is a cross-sectional elevation of the assembly illustrated in FIG. 1 in operative relationship relative to a supporting wall lined with a panel of insulation material and with the weather strip supporting a panel such as a window pane and the like;

FIG. 3 is a prospective view of a combination weather strip-garnish moulding in accordance with a second preferred embodiment of the present invention; and FIG. 4 is a cross-sectional elevation of the same type of weather strip illustrated in FIG. 3 utilized in operative relationship for supporting a panel of insulation such as in the application illustrated in FIG. 2.

DETAILED DESCRIPTION OF THE PREFERRED EMBODIMENTS

With reference now to FIGS. 1 and 2 of the drawings, a gasket glazing system in accordance with a first preferred embodiment of the present invention is indicated generally at 10. The system 10 comrises a generally L-shaped cover strip 12 adapted to be interlockingly connected to a self-sealing weather strip or gasket 14. The weather strip 14 is preferaby formed by an extrusion process of an elastomeric material such as ethylene-propylene, diene monomer (EPDM) or neoprene. Since the cover strip 12 is manufactured separately from the weather strip 14, it may be formed from an elastomeric material having a durometer reading less than that usually required of the weather strip thereby allowing greater flexibility and correspondingly easier system installation. By way of example, the cover strip 12 can also be formed from EPDM or neoprene, or alternatively can be formed from a vinyl material such as polyvinyl chloride.

The cover strip 12 of the present invention comprises a side wall section 16 of generally tapered cross-section having an arcuately shaped lip 18 at a lower end which is adapted to form a seal and compressively retain a panel of insulation 84, as shall hereinafter become apparent. The strip 12 also comprises a transversely extending upper section 20 having one end integrally connected to the upper end of the section 16 and having a double flange protrusion located at an opposite end. The protrusion 22 is formed by an enlarged arcuately shaped end wall portion 24 and a pair of retaining shoulders 26 and 28 disposed at an inward end thereof. In a preferred construction of the cover strip 12, the angle between the sections 16 and 20 is preferably less than 90° whereby the lip 18 will be compressively biased relative to the insulation panel during assembly of the system 10. To further facilitate bending between the sections 16 and 20, a relatively small circular shaped cut-out 29 is located at the corner between the rear wall of the section 16 and the lower wall of the section 20 as viewed in FIG. 1.

As best seen in FIGS. 1 and 2, the gasket or weather strip 14 is generally oval shaped in cross-section and includes upper and lower channels or recesses 30 and 56 which are adapted to cooperatively receive a supported panel 80 such as, by way of example, a window pane, and a cooperative mounting flange 82 located around the perimeter of the wall opening, respectively. The upper channel 30 is formed by oppositely spaced side walls 32 and 34 and a lower panel seating surface 36. The side wall 34 is formed on a relatively large diameter and includes a lip seal 38 located at an upper end which is, during assembly, biased against the right side of the panel 60 to lock the panel 80 in place and also provide an efficient seal therebetween. With reference to the lower channel 56, a pair of oppositely spaced lip seals 64 and 66 are disposed at the lower ends of the side walls 58 and 60 and function to lockingly secure the gasket 14 relative to the flange 82. The gasket 10 is adapted to be slidably inserted on the flange 82 and is fixedly seated relative to an abutting surface 62 located at the inward end of the lower channel 56.

The gasket 10 also includes opposite laterally spaced passages 40 and 68 which provide cooperative locking or retention means for the panel 80 and cover strip 12, respectively. The passage 40 includes an upper concavely shaped groove 42 adapted to receive a cooperative finger 52 located at the end of an integrally formed lock strip 50. The lock strip 50 is foldable or bendable relative to a relatively small circular shaped cut-out 48 located at the lower end of an arcuately shaped wall 46 forming a lower section of the passage 40. An opposite end of the wall 46 extends at least partially between the panel receiving channel 30 and facilitates bending of the side wall 34 in a clockwise direction whereby to facilitate reception of the panel 80. After the panel 80 is installed in the channel 30, the locking finger 52 at the upper end of the lock strip 50 is insertably located in the groove 42. In response to seating the locking finger 52 in the groove 42, each of the seal lips 38 and 64 are biased or compressed against the panel 80 and mounting flange 82, respectively, thereby providing a self-sealing weather strip.

As indicated previously, the passage 68 is adapted to co-operatively receive and secure the cover strip 12 which in turn is adapted to compressively retain an adjacent marginal edge of a panel of insulation 84 or the like. The passage 68 comprises an enlarged inward cavity defined by an arcuately shaped inner wall 74 and upper and lower spaced retaining shoulders 76 and 78. An outward passage extends between the inward cavity and the outer periphery of the gasket 14. More particularly, the outward passage is defined by arcuately shaped wall surfaces 70 and 72, the former of which includes a lip seal 79 at an outer end thereof. As best seen in FIG. 2, the enlarged protuberance 22 is slidably inserted within the passage 68 and self-seated by the abutment of the shoulders 26 and 28 with the retaining shoulders 78 and 76, respectively. In the seated position of the cover strip 12 as illustrated in FIG. 2, it will be noted that as the double flange protrusion 22 is interlockingly seated within the arcuately shaped recess 74 and the side wall 16 is subject to be biased slightly to the left with the lip 18 forming a seal relative to the left surface of the panel of insulation 84. The bias applied to the side wall 16 by virtue of the deflection of the side wall 16 urges the shoulders 26 and 28 of the double flange protrusion 22 in compressive engagement against the retaining shoulders 76 and 78 with the result being that the cover strip 12 is self-sealingly positioned and interlocked in the passage 68 and the panel of insulation 84 is compressively retained relative to the opening formed in the support structure.

As described above, the first embodiment of the present invention is primarily concerned with a weather strip having a separate cover strip which is insertable into the gasket member to retain the edge of an insulation panel and to aesthetically finish off the interior appearance of the window or windshield. In accordance with another form of the present invention, the same principle can be applied to an interior garnish moulding. It will be noted that in a vehicle or building structure without an insulation panel, a garnish moulding utilizing the same interlocking means as the above described cover strip 12 may be inserted into the weather strip 14 to achieve a desired decorative effect. Such a garnish moulding effect is illustrated in FIG. 3 wherein identical parts, components, elements, including sub-portions and sections thereof are indicated by the same numeral utilized in the embodiment of FIGS. 1 and 2, but with the addition of a prime (') suffix. With reference then to FIG. 3, a glazing system 10' in accordance with a second preferred embodiment of the present invention is shown as comprising a cover strip 12' and a weather strip or gasket 14'. In accordance with the form of the invention previously described in conjunction with the glazing system 10, the weather strip comprises a channel or passage 30' adapted to cooperatively and sealingly receive a supported panel 80', and a lower inwardly extending, U-shaped recess 56' adapted for supporting the weather strip 14' relative to an opening formed in a supporting structure 82'. The supporting structure 82' is comprised of a laterally extending wall section 85 having a folded outer end indicated generally at 83 which defines a mounting flange for cooperatively receiving the gasket 14'. In the embodiment illustrated, a separate lock strip 17 functions in a generally analogous manner as the integral lock strip 50 previously described in conjunction with the first embodiment and is disposed in a complementarily formed passage 15 located in the outer right side of the weather strip 14'. On an opposite side of the weather strip 14', a recess 68' shaped identically to the recess 68 previously described is adapted to receive an enlarged protrusion at the end of a garnish moulding 12' whereby to be interlockingly connected to the gasket 14'. The opposite end of the cover strip 12' icludes an arcuately shaped toe or lip seal 18' which is biased against an upper adjacent surface of the support panel 85 whereby to sealingly engage the moulding 12' thereto. In the second embodiment, however, it will be noted that the moulding 12' provides a decorative finished appearance around the perimeter of the opening formed in the supporting structure 82' and enhances the decorative or aesthetic effect as opposed to retaining a panel of insulation.

For some applications of supporting the marginal edge of an insulation panel, it may be desirable to utilize a two-piece gasket such as illustrated in FIG. 3 in lieu of a one-piece weather strip such as was illustrated in FIGS. 1 and 2. In this regard and as best seen in FIG. 4, a two-piece weather strip 14'' is illustrated in an application similar to that illustrated in FIG. 2. For purposes of clarity, identical members, components, etc. are again indicated with the same numerals utilized in FIGS. 1, 2, and 3 but with the addition of a double prime ('') suffix. In FIG. 4, a sheet of insulation 84'' is located on the inner side of a panel 82'' and secured along an upper marginal edge by a cover strip 12''. The left side of the gasket 14'' can be identical with the left side of either of the gaskets 14 and 14', and can include appropriately formed flange receiving and panel receiving recesses adapted for connecting the panel 80'' and mounting the gasket 14'' to a supporting structure 82'' respectively. The only variance is a separate lock strip 17'' which is disposed in a complementarily formed recess in the right side of the weather strip 14''.

It will be noted that each of the various embodiments of the present invention comprise a weather strip with a separate insertable cover strip. The cover strips are inserted into the weather strips during assembly of the window system, are held in place by an interlocking means or arrangement, and can be produced in different sizes to accommodate corresponding thicknesses of insulation used in the vehicle or building structure. It will also be noted that the thickness of the insulation panel has no influence on the actual weather strip to be used; only the dimensions of the cover strip need be considered. It will also be seen in accordance with the present invention, that instead of supporting the marginal edge of an insulation panel, that the same principles can be utilized in providing a garnish moulding. With respect to some of the preferred applications of the present invention, by way of example, the present invention will find particular utility in industrial or agricultural applications, as for instance mobile homes, trailers, recreational vehicles, busses, marine crafts, passenger trains, and similar applications where a stationary window is sealed with an elastomeric strip.

While it will be apparent that the preferred embodiments of the present invention are well calculated to fulfill the objects and advantages above stated, it will be appreciated that the invention is susceptible to modification, variation, and change without departing from the proper scope or fair meaning of the sub-joined claims.

We claim:

1. Mounting and trimming elements for a thin panel within an opening in a supporting structure having an inner liner, said elements embodying a resilient gasket having a first pair of oppositely outwardly presenting vertically disposed recesses for the acceptance of the edge portions of said panel and supporting structure respectively in substantially vertical aligned relation, a second pair of outwardly presenting recesses in substantially horizontal aligned relation disposed between said first pair of recesses located substantially normal thereto, a lock strip disposed in one of said second pair of recesses for exerting a closing bias on said first pair of recesses to pinch said gasket against said panel and supporting structure respectively, a cover strip having one edge extending into the other of said second pair of recesses which has an inner enlargement, and an enlargement along said one edge of said cover strip which is within said recess for extending into the enlargement provided therein.

2. Mounting and trimming elements for a thin panel as recited in claim 1, wherein said cover strip is of L-shape having two substantially right angle extending leg portions the inner portion being disposed within said recess having the enlargement, the outer leg portion being disposed substantially at right angle thereto, the inner leg portion of different sealing strips varying in width to have the right angle portion provide a holding force at the edge of the liner.

3. Mounting and trimming elements for a thin panel as recited in claim 1, wherein a sealing lip is provided along one edge of the cover strip supporting recess for sealing the cover strip within the gasket.

* * * * *